(12) United States Patent
Korin et al.

(10) Patent No.: US 8,492,050 B2
(45) Date of Patent: Jul. 23, 2013

(54) POLYMER ELECTROLYTE FUEL CELLS MEMBRANE AND A METHOD OF CREATING THEREOF

(75) Inventors: Eli Korin, Beer Sheva (IL); Armand Bettelheim, Beer Sheva (IL)

(73) Assignee: Ben Gurion University of the Negev Research & Development Authority, Beer Sheva (IL)

( * ) Notice: Subject to any disclaimer, the term of this patent is extended or adjusted under 35 U.S.C. 154(b) by 1439 days.

(21) Appl. No.: 11/644,786

(22) Filed: Dec. 22, 2006

(65) Prior Publication Data

US 2007/0160889 A1 Jul. 12, 2007

(51) Int. Cl.
*H01M 8/00* (2006.01)
*H01M 8/10* (2006.01)
*H01M 4/48* (2010.01)

(52) U.S. Cl.
USPC ............... 429/492; 429/479; 429/491

(58) Field of Classification Search
USPC .................................................. 429/492
See application file for complete search history.

(56) References Cited

U.S. PATENT DOCUMENTS

| 6,042,958 | A * | 3/2000 | Denton et al. ............... 429/492 |
| 2002/0177039 | A1* | 11/2002 | Lu et al. ...................... 429/213 |
| 2007/0122675 | A1* | 5/2007 | Angell et al. ................. 429/33 |

FOREIGN PATENT DOCUMENTS

WO  WO 2005/045976  4/2005

* cited by examiner

*Primary Examiner* — Barbara Gilliam
*Assistant Examiner* — Steven Scully
(74) *Attorney, Agent, or Firm* — Roach Brown McCarthy & Gruber, P.C.; Kevin D. McCarthy

(57) ABSTRACT

A polymer electrolyte membrane (PEM) for fuel cells is provided, as well as a method for manufacturing the PEM by direct casting on the fuel cells electrodes. The PEM, consisting of an ionic liquid entrapped within polysiloxane-RTV matrix, is stable at high temperatures, in acidic and basic environments, and exhibits a high conductivity, without the crossover of methanol.

7 Claims, 13 Drawing Sheets

(a)

3T crossection

Img —  100um
200x kv:25.0 Tilt:0

(b)

F K —  100um
200x kv:25.0 Tilt:0

(c)

SiK  100um
200x kv:25.0 Tilt:0

(d)

S K  100um
200x kv:25.0 Tilt:0

(a)

(b)

(c)

(d)

(a)

(b)

(c)

(d)

(a)

(b)

(c)

POLYMER ELECTROLYTE FUEL CELLS MEMBRANE AND A METHOD OF CREATING THEREOF

FIELD OF THE INVENTION

The present invention relates to fuel cell membranes, and more particularly to fuel cell membranes which contain ionic liquids.

BACKGROUND

A fuel cell is an electrochemical cell in which the energy of a reaction between a fuel, such as hydrogen, and an oxidant, such as oxygen, is converted directly and continuously into electrical energy. Fuel cells represent an evolving field of technology of pollution-free electricity generation that is expected to compete with traditional methods of creating and distributing electricity. It is also expected to be used in electricity powered cars, trucks and buses.

Proton-exchange fuel cells, also known as PEM (Polymer Electrolyte Membrane) Fuel Cells ("PEMFC") are low temperature fuel cells which are being developed for transport applications as well as for stationary applications. In PEMFCs, hydrogen is split at the anode (which in practice is a thin layer of catalyst on the polymer membrane's surface) into protons, that travel across the membrane to the cathode (similar or identical to the anode layer) where they combine with oxygen and electrons (which have traveled to the cathode from the anode via an external "load" circuit) to create water, the cell's only product when using pure hydrogen. In order to function, the membrane must conduct hydrogen ions (protons) but not electrons as this would in effect "short circuit" the fuel cell. The amount of water has to be supervised, since excess of water lowers the efficiency of energy production until the point of short circuiting, and shortage of water medium or dehydration of the cell makes the transport of protons from the anode to the cathode difficult.

The most commonly used polymer electrolyte membrane (PEM) in fuel cells is perfluorinated polymer containing sulfonic groups called Nafion. Its special structure provides the polymer with high proton conductivity, chemical stability and mechanical strength. However this membrane suffers from several drawbacks comprising: (a) relative high cost; (b) reduced performance in fuel cells due to the high resistivity of the electrodes/membrane interface; (c) requiring high hydration in order to work effectively; (d) allowing the crossover of methanol from anode to cathode in direct methanol fuel cells (DMFCs) and thus decreasing the performance of these fuel cells; and (e) limiting the work to acidic environment.

DMFCs are fuel cells in which compressed hydrogen is replaced with methanol for outer energy source replenishment, since methanol is easier to handle than hydrogen and produces energy density orders of magnitude greater than even highly compressed hydrogen. Overcoming the drawbacks of hydrogen-based fuel cells, which use water as the conducting medium, and Nafion as the membrane, requires the replacement of hydrogen with methanol and Nafion with another ion-conducting membrane material.

Among the many different proposed membrane alternatives for Nafion is a combination of a polymeric matrix and an ionic liquid. Such composite membrane is described, for example, in WO 2005/045976 in methanol-based fuel cells. This publication, however, fails to demonstrate any contribution of the ionic liquid membrane fuel cells to electrical conduction, especially when compared to cell assemblies where no ionic liquid is used.

It is, therefore, an object of the present invention to provide a PEM (Polymer Electrolyte Membrane) which has high electrolytic conductivity.

It is another object of the present invention to provide a PEM that does not depend on the membrane water content and provides high electrical conductivity even at elevated working temperatures.

It is yet another object of the present invention to provide a PEM that can operate in acidic as well as in basic environments.

It is yet another object of the present invention to provide a PEM without the crossover of methanol through the membrane from the anode to the cathode.

It is yet another object of the present invention to provide a cost-effective low resistivity PEM that can be prepared as a self-standing membrane or as a direct cast on fuel cells electrodes.

It is yet another object of the present invention to provide a method for producing a PEM according to the present invention.

This and other objects of the invention shall become clear as the description proceeds.

SUMMARY OF THE INVENTION

Figure 1A:
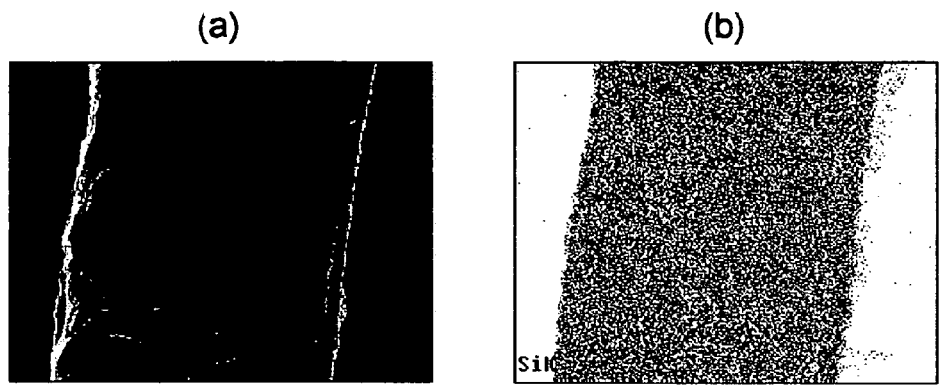
FIG. 1(A-G) shows SEM images as well as EDX mapping for the various elements present in cast polysiloxane based RTV (Room Temperature Vulcanized and the various ILBM (Ionic Liquid Based Membrane) types. ILBM are the initials used throughout the text for the ionic liquid membranes of the present invention)

The present invention provides PEMs (Polymer Electrolyte Membranes) that are comprised of a polysiloxane-based RTV operating as a flexible network and an ionic liquid, which is entrapped within it. The PEMs of the present invention provide chemical stability, high proton conductivity, and improved flexibility.

Since the main properties required for a fuel cell membrane are proper mechanical properties and high electrolytic conductivity, the new PEM comprises a combination of one component, namely the polysiloxane-based RTV, that imparts to the membrane its mechanical features as flexibility, strength and ruggedness, and a second component, i.e., an ionic liquid (IL) present as a salt in its molten state at room temperature, that is highly ionically conductive. The abbreviation used in the present invention for the new membrane is ILBM (Ionic Liquid Based Membrane).

In contrast to Nafion, that has to be pressed onto the electrodes using high temperature and pressure equipment, the new polymer electrolyte membrane (PEM) can be directly cast on fuel cells electrodes. This is expected to reduce the membrane/electrode interface resistivity and the cost of preparation of the MEA (Membrane Electrode Assembly). Although the ionic liquids which are used in the ILBM are considered to be expensive, modification of the membranes composition by ion exchange techniques and in-situ preparation of the ionic liquid in the membranes allow significant cost reduction. For this purpose, the present invention proposes the following three types of ILBMs according to the methods of their preparation:

1. Membranes in which the proper ionic liquid is introduced during the preparation of the membrane. Two non-limiting examples are RTV-BmimBF$_4$, and RTV-EmimCF$_3$SO$_3$ (B=Butyl, E=Ethyl, mim=methylimidazolium).
2. Introduction of an ionic liquid with a particular anion in the membrane and then exchanging it with another anion from its salt in aqueous solution. For example, the following ion-exchange reaction is suitable for preparing an ILBM:

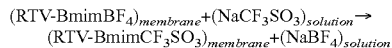
(RTV-BmimBF$_4$)$_{membrane}$+(NaCF$_3$SO$_3$)$_{solution}$→
(RTV-BmimCF$_3$SO$_3$)$_{membrane}$+(NaBF$_4$)$_{solution}$ 3. Introduction of an inexpensive solid salt (non-ionic liquid) after dissolving it in the RTV matrix and then producing the ionic liquid in this matrix by ion exchange. A non-limiting example for this route is provided herein:

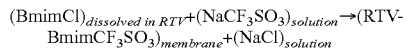
(BmimCl)$_{dissolved\ in\ RTV}$+(NaCF$_3$SO$_3$)$_{solution}$→(RTV-BmimCF$_3$SO$_3$)$_{membrane}$+(NaCl)$_{solution}$ In all the above described routes for preparing an ILBM membrane, different derivatives of imidazolium salts, other than those specified, may be used for preparing the ionic liquid either in an already prepared ILBM, or by other routes for in situ routes of preparation of the membrane.

In still another embodiment of the present invention pyridinium ionic liquids may be used either for an already prepared ILBM, or pyridinium salts may be used for in situ preparation of a pyridinium based ionic liquid.

The presence of the CF$_3$SO$_3^-$ group increases the electrolytic conductance of the membranes, and allows for proton transfer, which is necessary for the membrane application in fuel cells.

In one preferred embodiment the ILBM of the present invention is prepared according to the third method, since it enables the preparation of an ionic-liquid-RTV PEM by using low-cost starting materials in an in situ process. Accordingly, in one preferred embodiment, the present invention provides a PEM that comprises a BmimCF$_3$SO$_3$ ionic liquid entrapped in a polysiloxane-RTV network membrane, and that is produced in situ by introducing a chloride salt (which is not an ionic liquid but includes a Bmim cation) in the RTV network and by reacting it with a salt solution of the trifluoro-methyl sulfonate cation. This forms the ionic liquid BmimCF$_3$SO$_3$ in the RTV matrix.

In one aspect of the present invention, the new membrane can be prepared as a self-standing membrane. In contrast to Nafion which has to be pressed onto the electrodes using high temperature and pressure equipment, the new PEM can be directly cast on fuel cells electrodes. This reduces the membrane/electrode interface resistivity. This is also expected to reduce the cost of preparing the MEA.

In another aspect of the present invention, the high electrolytic conductivity of the ionic liquid, in principle, does not depend on humidity. Therefore, in contrast to Nafion, the conductivity of the new membrane does not depend significantly on the water content of the membrane, and therefore can be operational at higher temperatures than Nafion.

In still another aspect of the present invention, the new membrane can be used in acidic as well as basic media as is demonstrated in half-cell experiments. This is in contrast to Nafion which can be used only in acidic fuel cells. This is an innovative feature of the PEM of the present invention, since efficient commercially available membranes, which can be used in a basic high power fuel cell, are not available.

In still another aspect, PEMs of the present invention essentially do not permeate methanol in DMFCs, particularly, ILBMs with a thickness above 140 µm which have been tested in half-cell experiments, and especially when compared to the commercial 180 µm thick Nafion membrane that does permeate methanol. Methanol crossover through the membrane from anode to cathode is a main problem encountered when using Nafion in DMFCs (Direct Methanol Fuel Cells). This causes poisoning of the cathode catalyst and severe decrease of the fuel cell performance. Therefore, the membranes of the present invention are considered to be useful not only in H$_2$/O$_2$ fuel cells but also in DMFCs.

In still another aspect of the present invention, the permeability to methanol of the ILBM is dependent on the membrane thickness, and on the concentration of methanol. Particularly, the ILBM of the present invention, having a thickness equal to or greater than 140 µm, does not permeate methanol.

In still another preferred embodiment of the present invention, the ionic liquid is dispersed evenly in the membrane matrix.

In one embodiment of the present invention, the ionic liquid is BmimBF$_4$ (1-butyl-3-methylimidazolium tetrafluoroborate, where B stands for butyl, and mim for methylimidazolium).

In another embodiment of the present invention, the ionic liquid is EmimCF$_3$SO$_3$ (1-ethyl-3-methylimidazolium trifluoromethyl sulfonate, where E stands for ethyl).

In still another aspect of the present invention, the ILBM is resistant to temperature changes, and the ILBM operates also at elevated temperatures. The conductivity of the ILBM does not depend significantly on the membrane water content and it can, therefore, be heated to high temperatures without substantial loss of conductivity.

In still another embodiment of the present invention, the ILBM is chemically stable up to a temperature of 400° C. according to TGA (Thermogravimetric Analysis) measurements.

In one aspect, the present invention provides a method of preparing ILBM, wherein the method comprises combining a first component that imparts to the membrane its mechanical features, that component being a polysiloxane-based-RTV, and a second component that is highly conductive, namely an ionic liquid which is in its molten state at room temperature.

In one route, the combination of the two abovementioned components takes place by introducing an ionic liquid to the RTV matrix during the preparation of the membrane. Preferred combinations prepared this way are RTV-BmimBF$_4$ and RTV-EmimCF$_3$SO$_3$.

In a second route, the combination of the two components is carried out by introducing an ionic liquid with a particular anion in the membrane and then exchanging it with another anion from its salt in aqueous solution.

In one preferred embodiment, the following ion-exchange reaction is suitable for preparing an ILBM according to the second route:

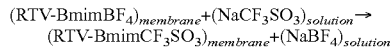

(RTV-BmimBF$_4$)$_{membrane}$+(NaCF$_3$SO$_3$)$_{solution}$→
(RTV-BmimCF$_3$SO$_3$)$_{membrane}$+(NaBF$_4$)$_{solution}$ In a third route the ILBM of the present invention comprises the combining of the two components by introducing an inexpensive solid salt (non-ionic liquid) after dissolving it in the RTV matrix and then producing the ionic liquid in this matrix by ion exchange. A non-limiting example for this route is provided herein:

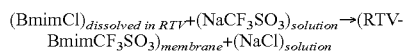

(BmimCl)$_{dissolved\ in\ RTV}$+(NaCF$_3$SO$_3$)$_{solution}$→(RTV-BmimCF$_3$SO$_3$)$_{membrane}$+(NaCl)$_{solution}$ In one preferred embodiment of the present invention, the ionic liquid is homogeneously dispersed in the membrane matrix, wherein the ILBM is prepared in the third route.

In still another embodiment of the present invention, the concentration of the ionic liquid in the ILBM prepared by the third route is increased by increasing both the concentration of the initial salt, and the time of ultrasonic ion-exchange treatment. Particularly, the time of ultrasonic treatment is increased to 3 hours.

DETAILED DESCRIPTION OF THE DRAWINGS

Figure 1B:
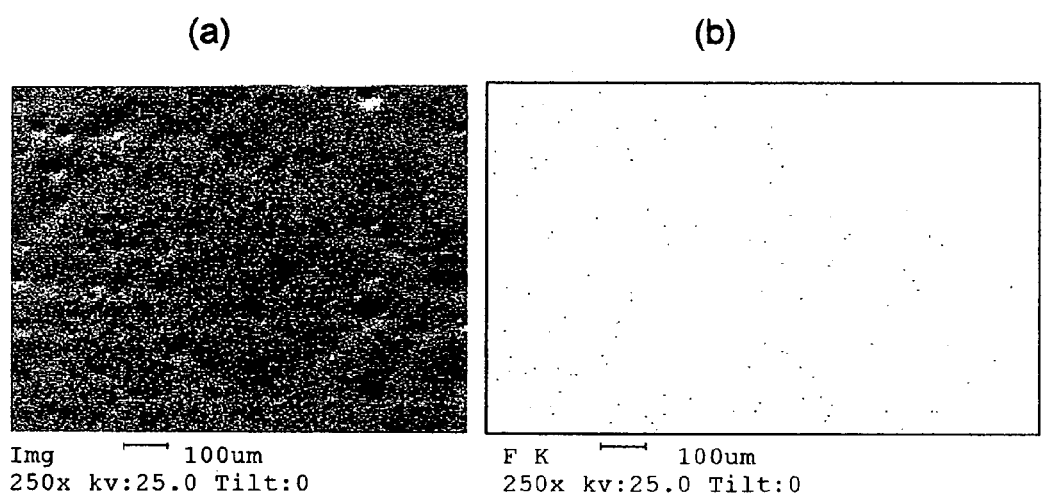
Figure 1B:
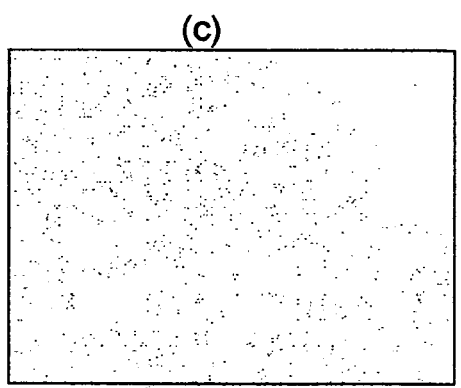
Figure 1C:
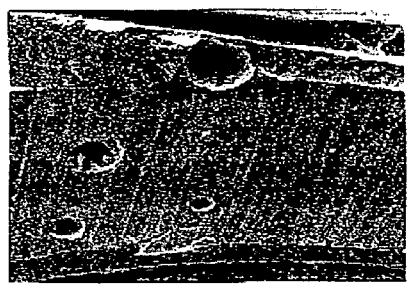
Figure 1C:
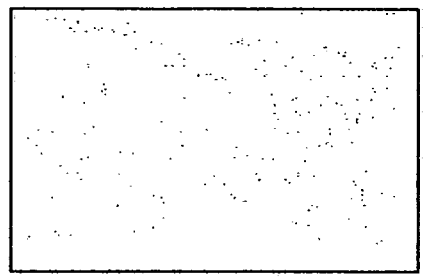
Figure 1C:
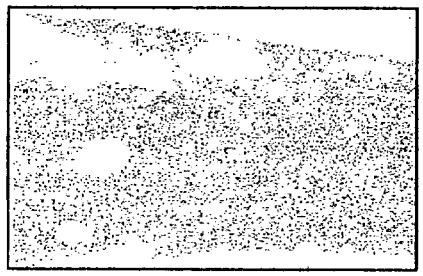
Figure 1C:
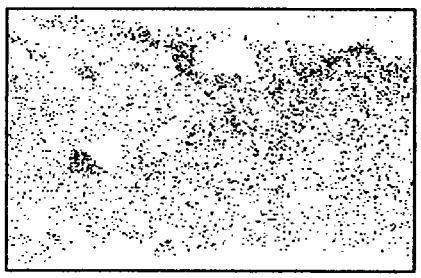

FIG. 1A shows (a) a SEM image for a cross section cast polysiloxane-RTV (also termed silicon-RTV, or RTV) and (b) EDX cross section mapping of Si for polysiloxane-RTV (magnification: ×300). FIG. 1B shows SEM images for a surface of a type 1 ILBM containing EmimCF$_3$SO$_3$ as ionic liquid (a), and EDX surface mapping for fluorine (b), and sulfur (c) elements (magnification: ×250). FIG. 1C shows SEM micrograph for a cross section of a type 1 ILBM containing EmimCF$_3$SO$_3$ as ionic liquid (a), and EDX cross section mapping for fluorine (b), silicon (c), and sulfur (d) elements (magnification: ×200). It can be concluded from these microscopic observations that the ionic liquid is homogeneously distributed within the membrane. However, due to the different viscosities of the two liquids, RTV and ionic liquid, the latter isolates as bubbles in the RTV matrix. Large drops of the ionic liquid cannot be entrapped by the surrounding matrix which leads to the observation of some empty bubbles throughout the membrane cross section.

Figure 1D:
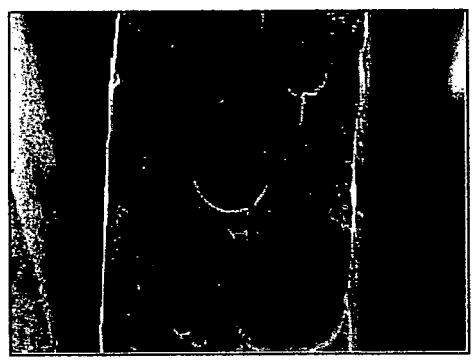
Figure 1D:
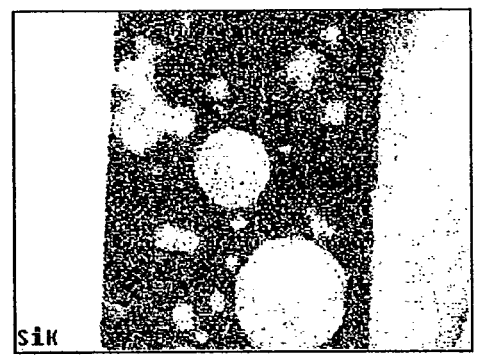
Figure 1D:
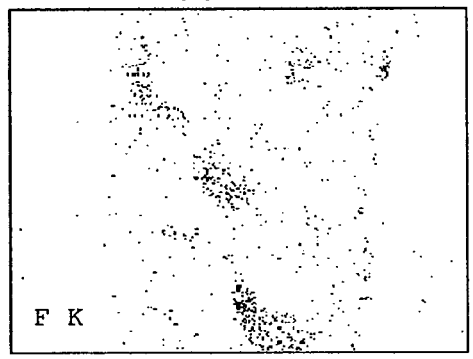
Figure 1D:
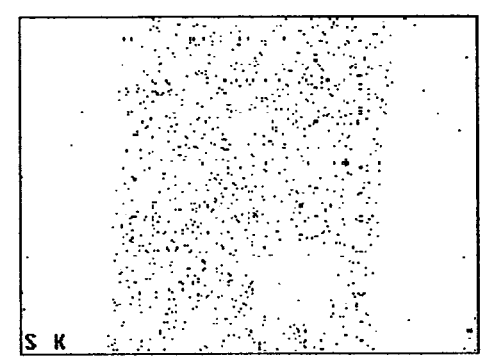
Figure 1E:
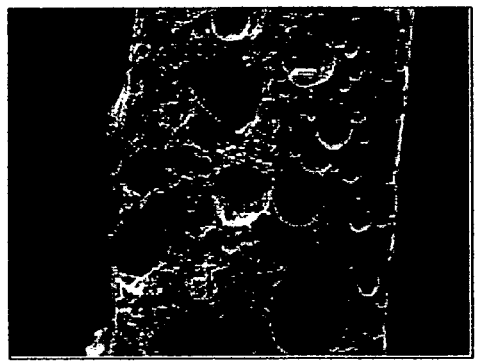
Figure 1E:
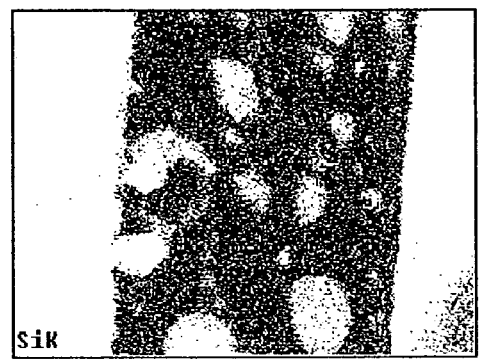
Figure 1E:
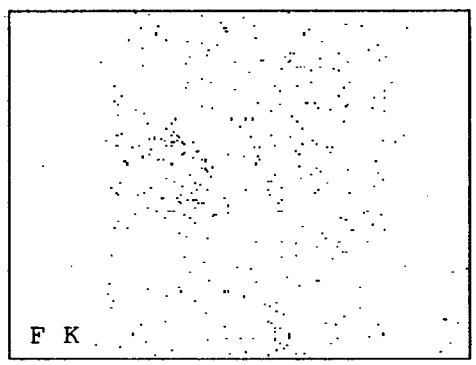
Figure 1E:

The same phenomenon is observed for a membrane consisting of RTV and BmimBF4 (FIG. 1D) and high porosity due to this effect is seen for type 2 ILBM (FIG. 1E). However, bubbles are not observed for RTV+BmimCl, before (FIG. 1F) as well as after exchanging Cl$^-$ by CF$_3$SO$_3^-$ (type 3 ILBM, FIG. 1G).

FIG. 1D shows SEM micrograph for a cross section of a membrane containing BmimBF$_4$ as ionic liquid (a) and EDX cross section mapping for silicon (b), fluorine (c) elements (magnification: ×300).

FIG. 1E shows SEM micrograph for a cross section of a type 2 ILBM (exchange of BF$_4^-$ by CF$_3$SO$_3^-$) (a) and EDX cross section mapping for silicon (b), fluorine (c), and sulfur (d) elements (magnification: ×300).

Figure 1F:
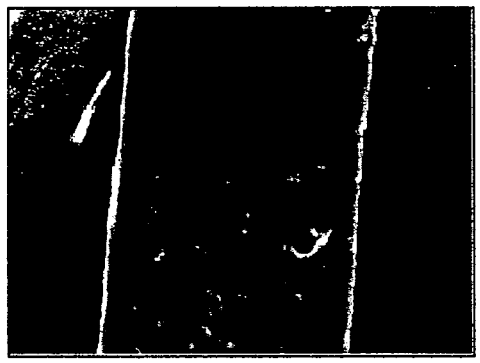
Figure 1F:
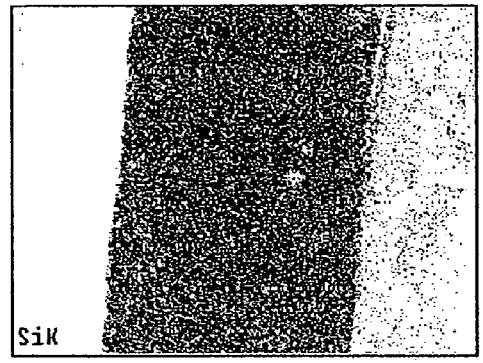
Figure 1F:
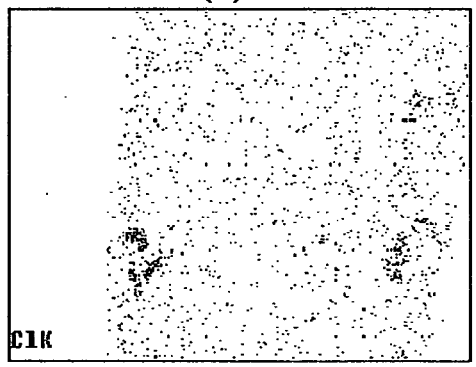

FIG. 1F is a SEM micrograph of a cross section for cast RTV containing BmimCl (a) and EDX cross section mapping for silicon (b), and chlorine (c) elements, (magnification: ×600).

Figure 1G:
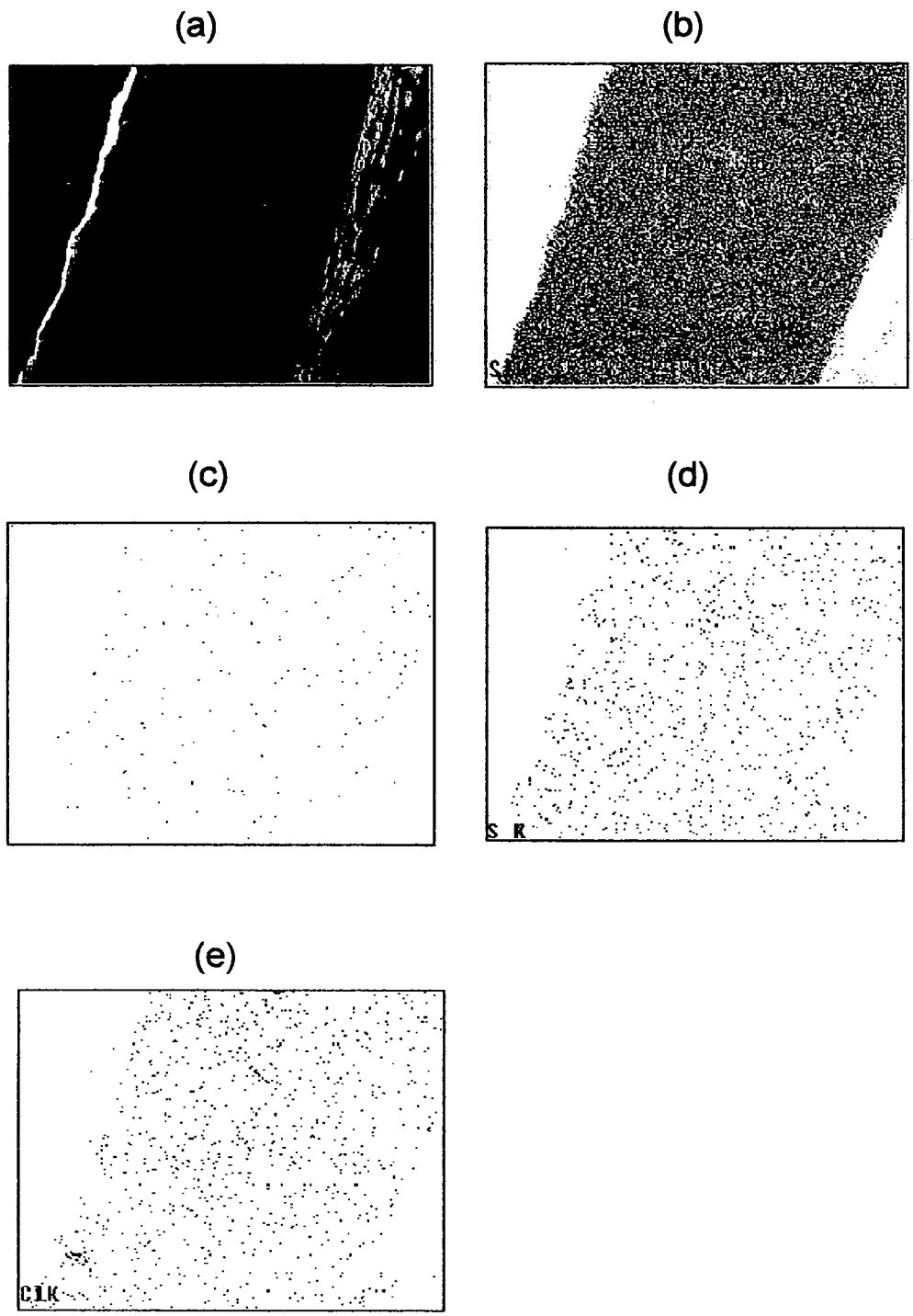

FIG. 1G is a SEM micrograph of a cross section of a type 3 ILBM (sonication in a NaCF$_3$SO$_3$ solution for three hours) (a) and EDX cross section mapping for silicon (b), fluorine (c), sulfur (d), and chlorine (e) elements (magnification: ×600).

The SEM/EDX results for the different matrixes and membranes are summarized in Table I below. The conclusions that are drawn from the SEM/EDX experiments are as follows:

(a) the highest concentration of CF$_3$SO$_3^-$ can be attained in type 1 ILBM which is obtained by mixing RTV and EmimCF$_3$SO$_3$ (S/Si=0.34, compared to 0.05 for type 2 ILBM and 0.005 for type 3 ILBM).

(b) type 1 and type 2 are more porous than type 3 ILBM.

(c) in type 3 ILBM, the ionic liquid is prepared in-situ after the matrix has been cast. This prevents bubbles formation and the membrane is non-porous, compared to membranes formed by mixing two liquids (types 1 and 2 ILBM). The CF$_3$SO$_3^-$ concentration in type 3 ILBM can be increased by increasing the BmimCl concentration in the matrix and by more efficient CF$_3$SO$_3^-$/Cl$^-$ ion exchange (S/Si and S/Cl$^-$ are increased by 25-30%) by increasing the ultrasonic ion exchange treatment time. Particularly, the time of treatment in the first sonication treatment is 1 hour, and is 3 hours in the second sonication treatment.

TABLE I

Summary of SEM/EDX results for the different matrixes and membranes

| | Matrix/Component (% At/At*) | | | | | | |
|---|---|---|---|---|---|---|---|
| | Si | S | Cl | F | S/Si | S/Cl | F/Si |
| RTV | 28.64 | | | | | | |
| Type 1 ILBM | 18.75 | 6.35 | | 4.10 | 0.339 | | 0.219 |
| RTV + BMIMBF$_4$ | 25.96 | | | 2.71 | | | 0.104 |
| Type 2 ILBM | 30.22 | 1.58 | | 0.84 | 0.052 | | 0.028 |
| RTV + BMIMCl | 31.5 | | 0.53 | | | | |
| Type 3 ILBM (sonication In CF$_3$SO$_3$Na for 1 h) | 34.13 | | 0.36 | | 0.004 | 0.361 | |
| Type 3 ILBM (sonication In CF$_3$SO$_3$Na for 3 h) | 40.44 | 0.18 | 0.38 | | 0.005 | 0.474 | |

*At = atomic percent

Figure 2:
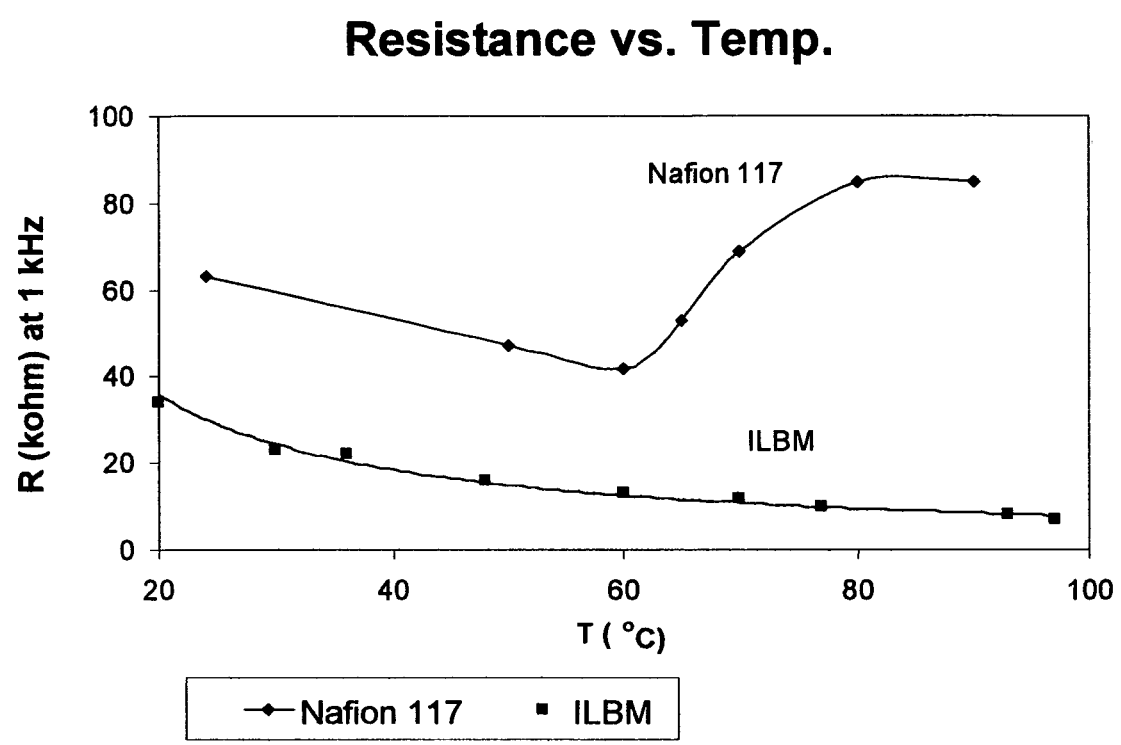
FIG. 2 shows the resistance measured as a function of temperature at RH (Relative Humidity)=3% for a type 1 ILBM as compared to the commercial Nafion 117 membrane.

FIG. 2 shows the resistance-temperature relationship obtained with a two-probe configuration for a self-standing ILBM (Type 1, RTV-CF$_3$SO$_3$) in comparison to Nafion 117. The thickness of the Nafion membrane is 0.18 mm according to the manufacturer, while that of ILBM was estimated in the 0.5 mm range. The two membranes were tested in similar experimental conditions (conductivity measured at 25° C. and 3% RH with similar pressure applied on the membrane).

Figure 3:
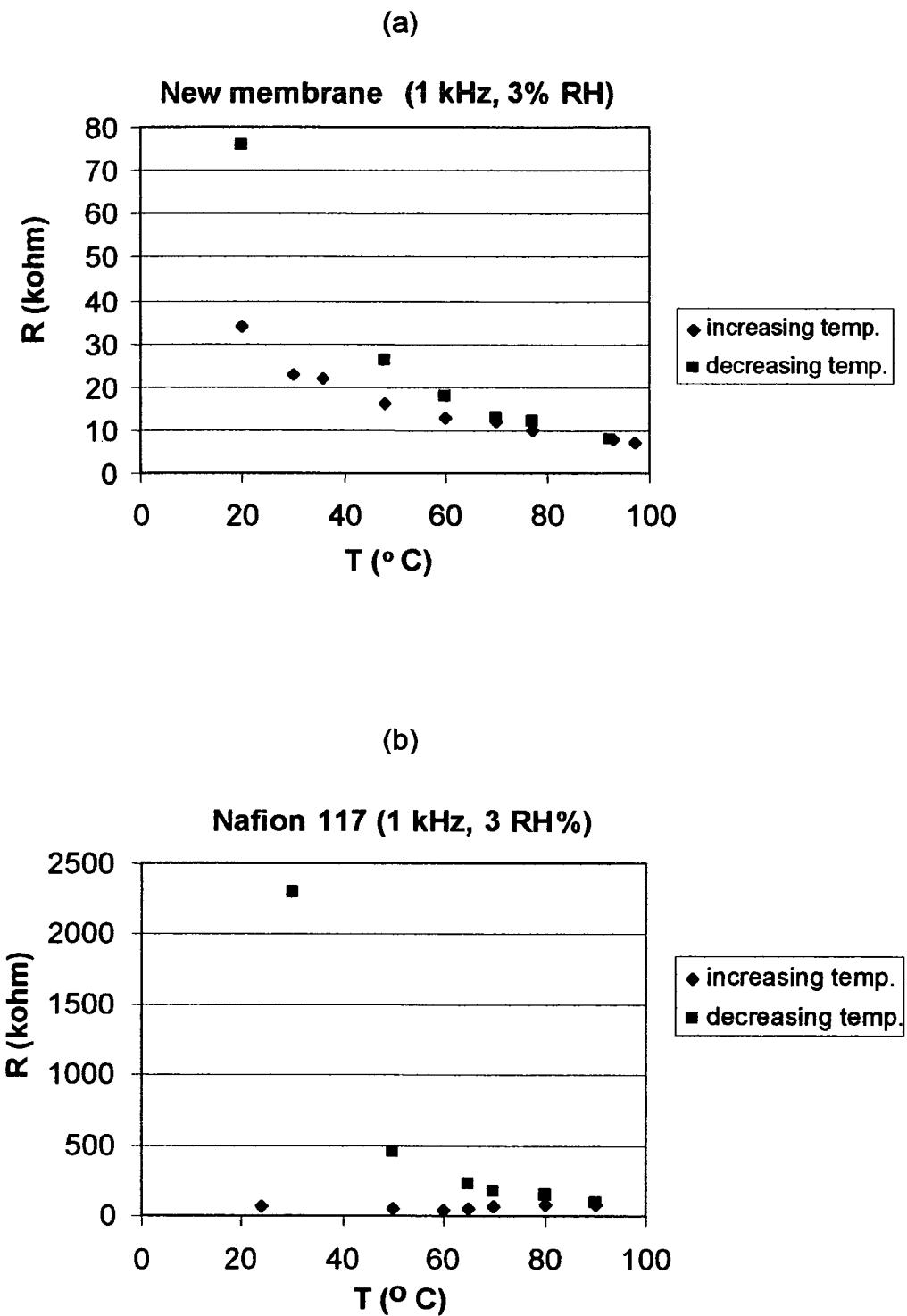
FIG. 3 shows the resistance as a function of temperature during a heating-cooling cycle for (a) a type 1 ILBM; (b) a commercial Nafion membrane.

It can be concluded from FIG. 2 that the conductivity of the ILBM is in the same order of magnitude of Nafion. The calculated specific conductivity at a frequency of 100 KHz of the ILBM at room temperature and 90% RH is 2.2 mS/cm. However, contrary to Nafion which begins to dehydrate at temperatures higher than 65° C., the conductivity of the ILBM does not depend substantially on the membrane water content and it can be heated to high temperatures without significant loss of conductivity. This can also be deduced from FIG. 3, in which the resistance was followed for both membranes for a whole cycle of heating up to 100° C. and cooling down to 25° C. Remarkable hystheresis is observed for Nafion (FIG. 3B) due to almost total hydration at high temperatures while insignificant increase of resistance is obtained for the ILBM after the heating half-cycle (FIG. 3A).

Figure 4:
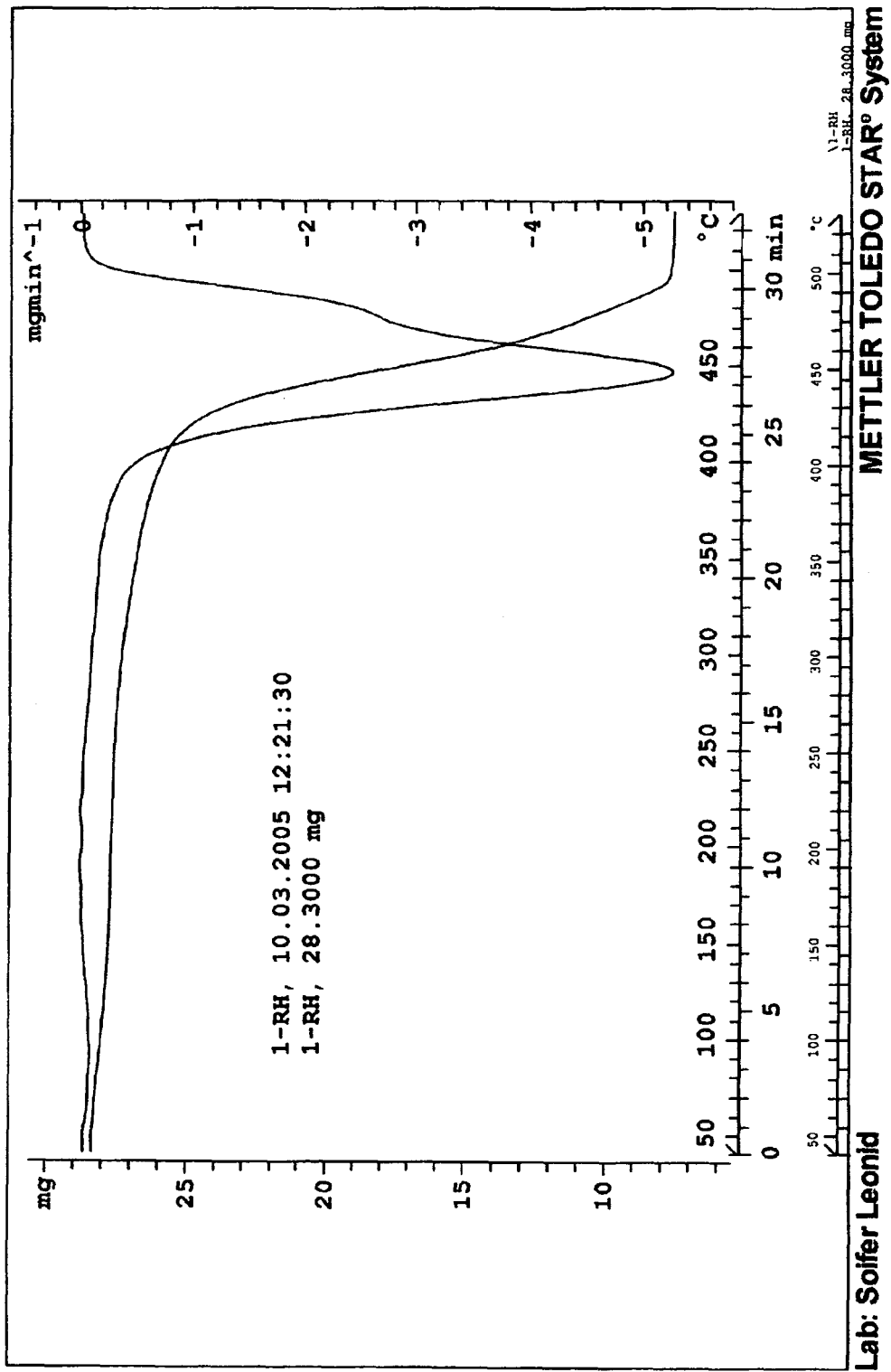
FIG. 4 is TGA (Thermogravimetric Analysis) and differential TGA curves obtained for a type 1 ILBM.

FIG. 4 shows a thermogravimetric analysis curve of the ILBM. It is clearly demonstrated by this Figure that the membrane is stable up to a temperature of 400° C. while degradation occurs only at higher temperatures.

Figure 5:
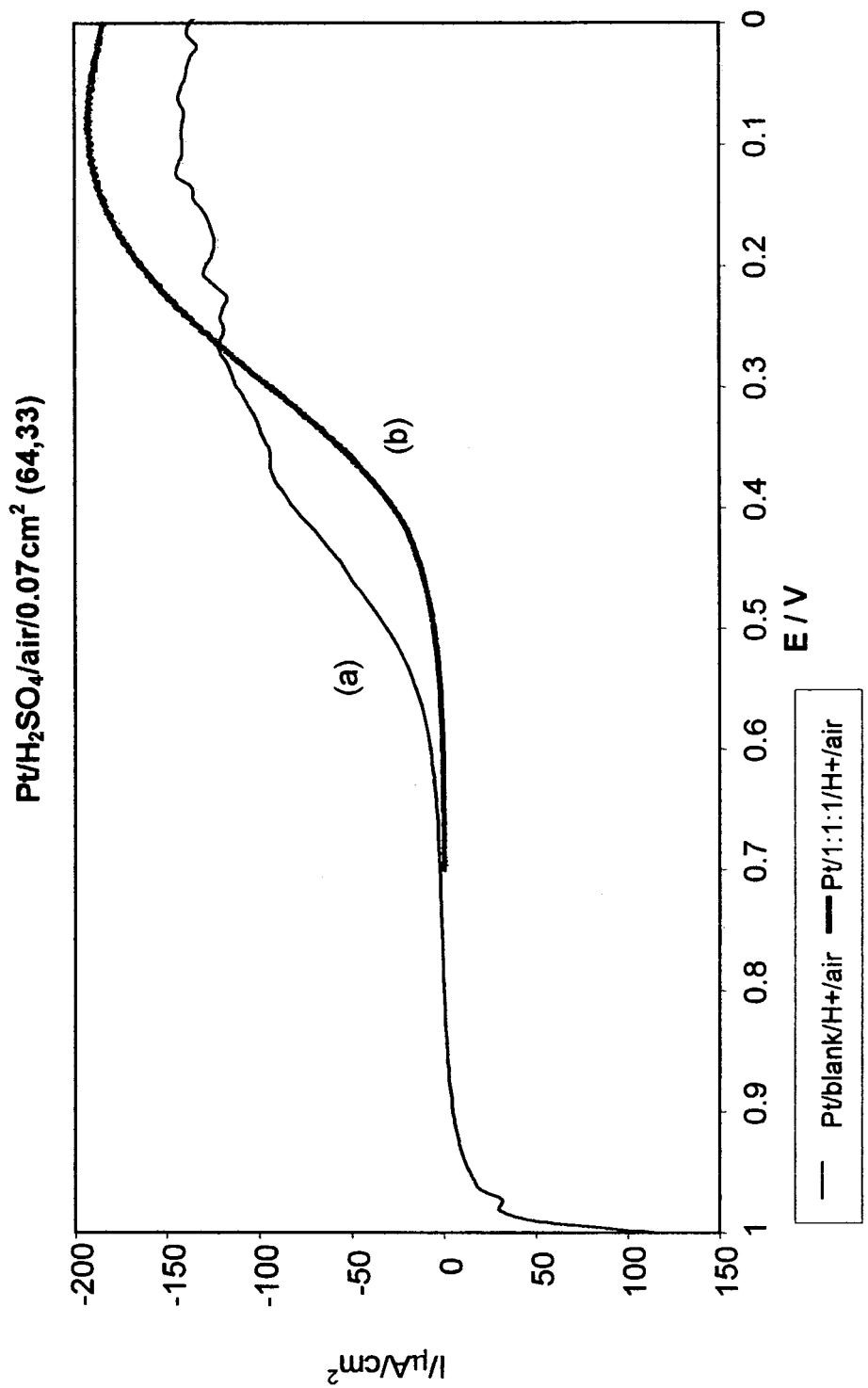
FIG. 5 shows the linear sweep voltammograms (scan rate 10 mV/s) obtained for oxygen reduction for: (a) a bare Pt electrode (Area=0.07 $cm^2$) and (b) a type 2 ILBM coated Pt electrode (Area=0.07 $cm^2$) in a 1M $H_2SO_4$ solution continuously supplied with air (50 cc/min)

Type 2 ILBM were cast as films on Pt electrodes and tested in half-cells in acidic or basic electrolyte. FIG. 5 shows a linear sweep voltammogram for oxygen reduction obtained in air saturated 1M $H_2SO_4$ for a Pt electrode coated with a type 2 ILBM (curve b) as compared to that obtained for a bare Pt electrode (curve a). The half wave potential ($E_{1/2}$) for oxygen reduction at the membrane coated electrode is cathodically shifted by ~100 mV, while the limiting current increases by ~25%.

Figure 6:
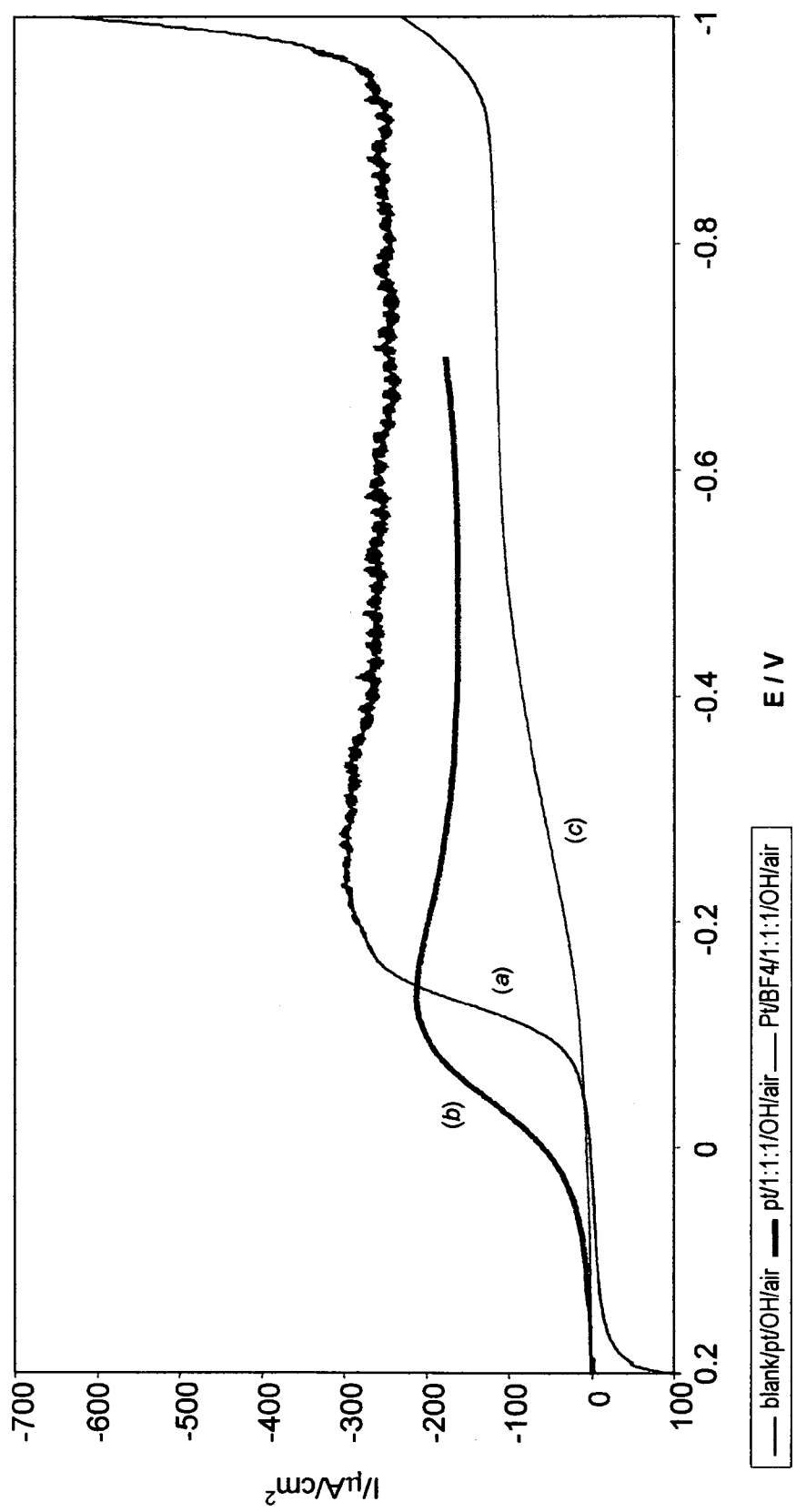
FIG. 6 shows the linear sweep voltammograms (scan rate 10 mV/s) obtained for oxygen reduction in a 0.1M KOH solution continuously supplied with air (50 cc/min) for (a) a bare Pt electrode (Area=0.07 $cm^2$), (b) a type 2 ILBM coated Pt electrode (Area=0.07 $cm^2$) and (c) a type 1 ILBM ($BF_4^-$ as anion) coated Pt electrode (Area=0.07 $cm^2$)

FIG. 6 shows linear sweep voltammograms for oxygen reduction at a bare Pt electrode (curve a) and for type 1 ($BF_4^-$) (curve c) and type 2 ($CF_3SO_3^-$) (curve b) ILBM-coated Pt electrodes in 0.1M KOH. In this case, $E_{1/2}$ for oxygen reduction at the type 2 ILBM-coated electrode is anodically shifted by ~50 mV, while the limiting current decreases by ~30% as compared to the bare electrode. However, oxygen reduction at the $BF_4^-$ based membrane (type 1 ILBM) yields much less satisfactory results: $E_{1/2}$ is much more cathodic and currents are significantly lower than those obtained with the $CF_3SO_3^-$ based membrane (type 2 ILBM in which $BF_4^-$ was exchanged by $CF_3SO_3^-$). It can be concluded from FIGS. 5 and 6 that as opposite to Nafion, the $CF_3SO_3^-$ based ILBM can be operated as films/membranes in acidic as well as in basic environments.

Figure 7:
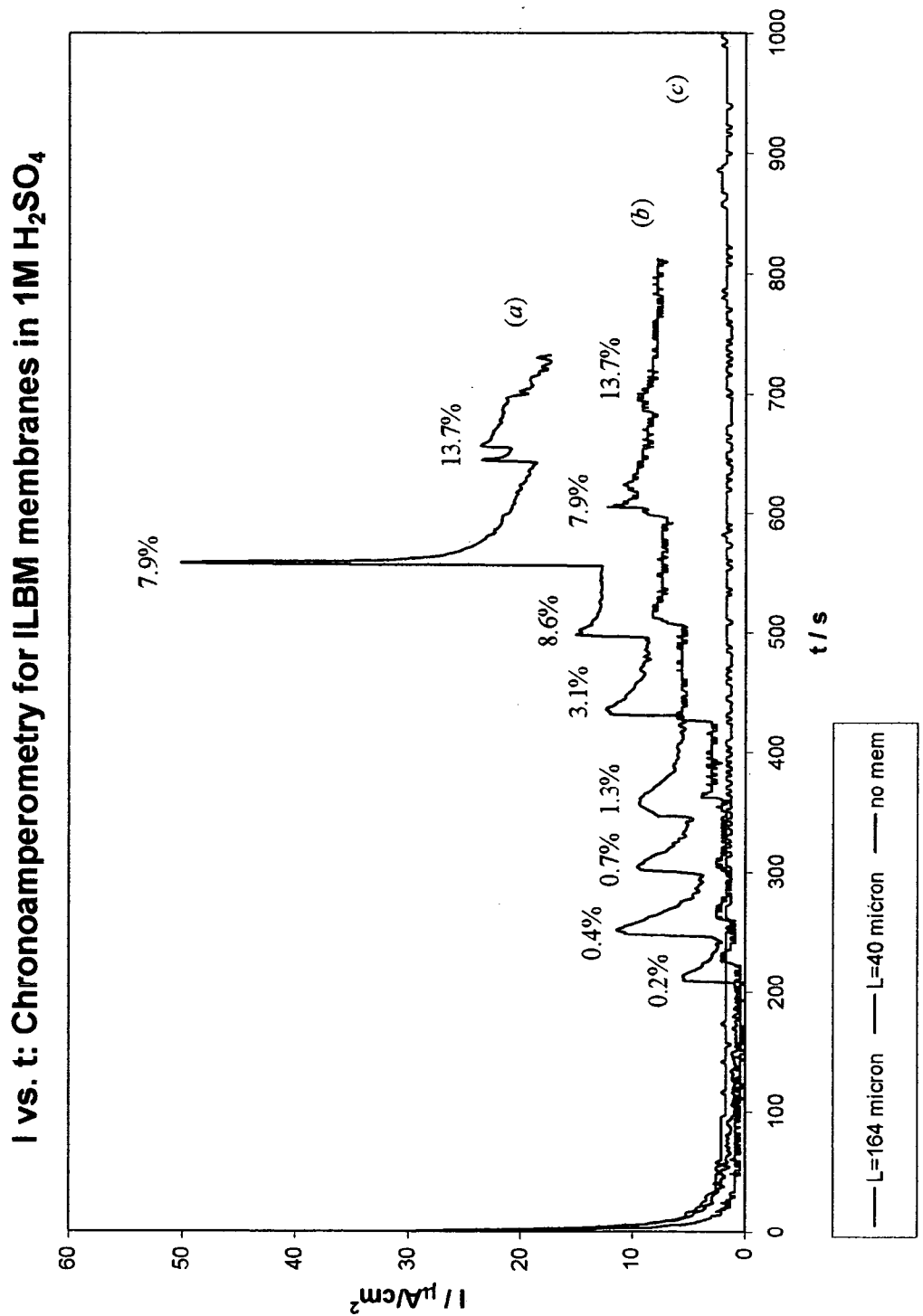
FIG. 7 shows chronoamperometry measurements at a potential of +0.8 V for the oxidation of increasing amounts of methanol in 1M $H_2SO_4$ for: (a) a bare Pt electrode (Area=0.07 $cm^2$), and for a Pt electrode (Area=0.07 $cm^2$) coated with a type 1 ILBM ($CF_3SO_3^-$ anion) which is (b) 40 μm and (c) 165 μm thick.

The ILBM were also tested for their permeability to methanol. This was achieved by coating Pt electrodes with type 1 ILBM ($CF_3SO_3^-$ as anion) films and performing chronoamperometric measurements in 1 M $H_2SO_4$ at +0.8 V, a potential at which methanol is oxidized at a bare Pt electrode. FIG. 7 shows typical chronoamperometric curves obtained in the absence and presence of increasing concentrations of methanol as obtained for a bare Pt electrode (curve a) as well as for Pt electrodes coated with ILBM, 40 and 165 μm thick (curves b and c, respectively).

Figure 8:
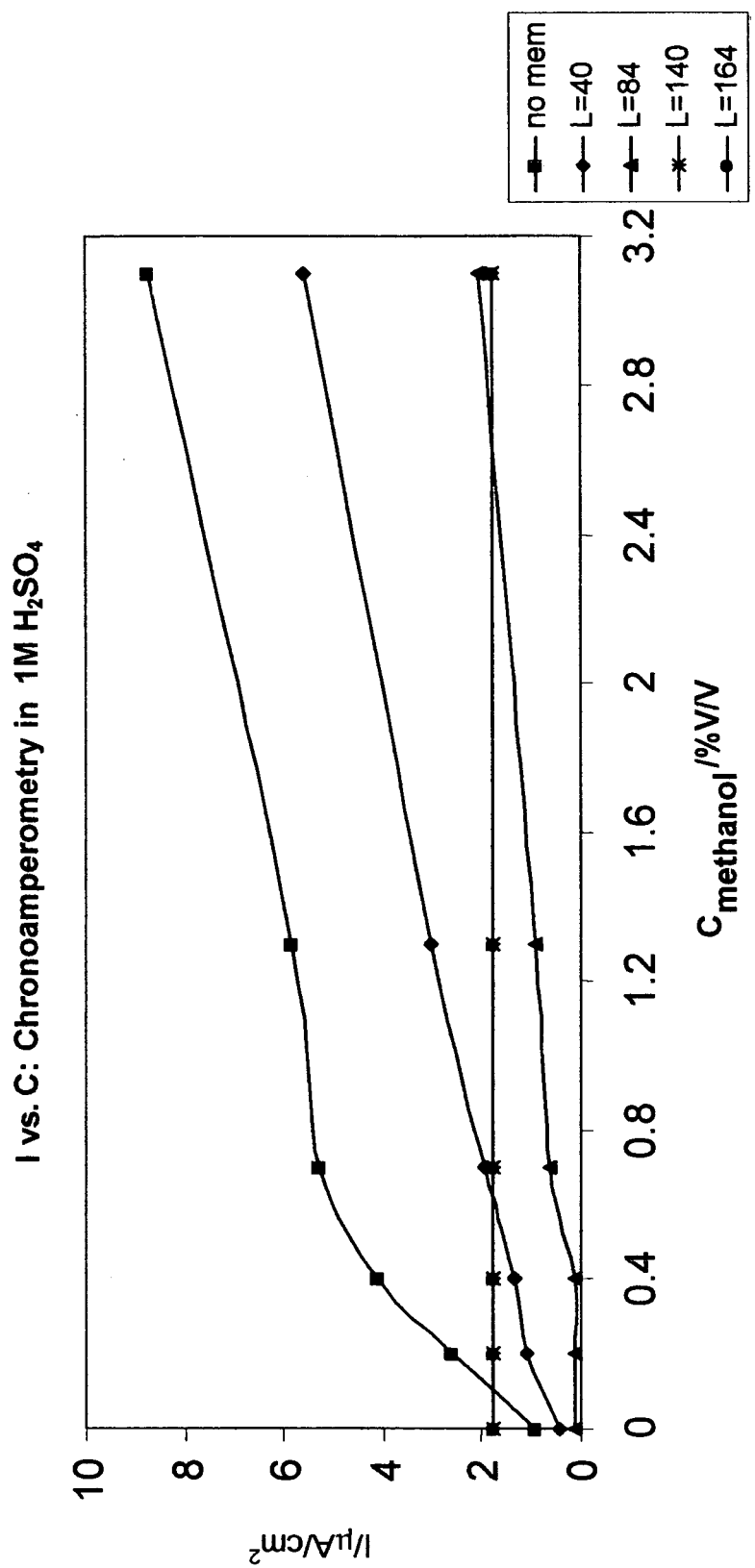
FIG. 8 shows chronoamperometric currents measured at a potential of +0.8 V vs. methanol concentration in 1M $H_2SO_4$ for: (a) a bare Pt electrode (Area=0.07 $cm^2$), and for a Pt electrode (Area=0.07 $cm^2$) coated with a type 1 ILBM ($CF_3SO_3^-$ anion) which is (b) 40, (c) 85, (d) 140, and (e)165 μm thick.

Since from FIG. 7 it can be deduced that the permeability of methanol in the ILBM depends on methanol concentration and the membrane thickness, methanol oxidation currents at +0.8 V were measured as a function of these two parameters, as summarized in FIG. 8. The slope of current vs. methanol concentration is smaller for the ILBM coated electrodes (curves b-c) as compared to the bare electrode (curve a). Moreover, this slope decreases as the membrane thickness increases. Membranes thicker than 140 μm do not permeate methanol. This enables to consider the ILBM as good alternatives to Nafion in DMFCs (Direct Methanol Fuel Cells), since Nafion 117 (~180 μm thick) is known to permeate methanol.

EXPERIMENTAL DATA

The following details the materials and properties thereof, which were used in the preparation of the ILBMs of the present invention, and methods of measurement and analysis employed on the membranes.

RTV is a vulcanized polysiloxane Silastic (R) 9161 RTV Rubber of Dow Company.

The Catalyst used for in situ preparation of the ionic liquid in the membrane is 9162 of Dow Company.

The composition of RTV+catalyst contains the following ingredients:
a) Silicic acid ($H_4SiO_4$), tetraethyl ester, hydrolyzed; CAS. No. 68412-37-3; 47% (w/w).
b) Tetraethyl silicate; CAS No. 78-10-4; 46% (w/w).
c) Dibutyltin dilaurate; CAS No. 77-58-7; 7.0% (w/w).
d) Diluter solution: 200 Fluid, Dow Company, chemical composition: $(CH_3)_3SiO[SiO(CH_3)_2]_nSi(CH_3)_3$ Ionic Liquids used are $BmimBF_4$ (1-butyl-3-methylimidazolium tetrafluoroborate) (Fluka or Chemada) or $EmimCF_3SO_3$ (1-ethyl-3-methylimidazolium trifluoromethyl sulfonate) (Fluka).

Typical type 1 ILBM composition is prepared according to the following weight relation:

1:1:1:1 (weight ratio) of RTV:Diluter:Catalyst solution: Ionic Liquid. Preparation is carried out by either manual mixing or by using an electric mixer.

Typical preparation of type 2 ILBM contains the following: Type 1 $BF_4^-$ based ILBM which is exposed overnight to a solution containing 1.65 M $CF_3SO_3K$ at pH 13.

Typical preparation of type 3 ILBM is carried out according to the following steps:
First step: mixing of 1:1:0.35:0.70:0.60 (weight ratio) of RTV:diluter:BmimCl:NaOH (1M):catalyst and letting the mixture overnight for hardening.
Second step: exposing to a 1M $CF_3SO_3Na$ solution (ultrasonic treatment in this solution for 1-3 hours and then exposure overnight to this solution).
Third step: exposure for at least 1 hour in 1M $H_2SO_4$.

The density of the self-standing membranes was determined (weight of samples with known dimensions) to be 1.10±0.05 g/cm³.

The thickness of ILBM films on electrodes was determined by the weight of the films, their density and the area of the electrodes.

All potentials in half-cell experiments refer to Ag/AgCl/KCl (satd.) as reference electrode. Electrochemical reactions were driven by an Ecochemie potentiostat.

Resistance was measured with a Wayne Kerr 4265 Automatic LCR meter and applying a constant pressure of ~40 N·cm⁻² on the membrane which was placed between two graphite electrodes. A heating element was introduced in one of the graphite electrodes and temperature was measured using a thermocouple located near the membrane.

Test Methods

Table II below details the different test and measurement methods used in the analysis of the ILBMs of the present invention.

TABLE II

Test methods used in analyzing ILBMs

| Test Method | Description |
| --- | --- |
| SEM (Scanning Electron Microscopy) | An electron microscope forms a three-dimensional image on a cathode-ray tube by moving a beam of focused electrons across an object and reading both the electrons scattered by the object and the secondary electrons produced by it. |
| EDX (Energy Dispersive X-ray spectroscopy) | Mainly used in chemical analysis, in a X-ray fluorescence spectrometer or in an Electron Microprobe (e.g. inside a scanning electron microscope): A semiconductor detector, usually silicon doped with lithium (Si(Li) detector) is polarised with a high voltage; when a X-ray photon hits the detector, it creates electron-hole pairs that drift due to the high voltage. The electric charge is collected, like charging a condensator; the increment of voltage of the condensator is |

TABLE II-continued

Test methods used in analyzing ILBMs

| Test Method | Description |
|---|---|
| | proportional to the energy of the photon, and it is thus possible to determine the energy spectrum. The condensator voltage is reset regularly to avoid saturation. |
| TGA (Thermogravimetric Analysis) | Determines changes in weight in relation to change in temperature. Relies upon a high degree of precision in three measurements: weight, temperature, and temperature change. |
| Voltammetry | A method for measuring electrical current or potential, in which only a small portion of the material is reduced (or less commonly oxidized) electrolytically. |
| Chronoamperometry | A method used to study diffusion-controlled electrochemical reactions and complex electrochemical mechanisms. It is performed by applying an initial potential at which no faradaic reaction is occurring, then stepping the potential to a value at which the electrochemical reaction of interest takes place. The current is measured throughout the experiment. |

EXAMPLES

The following examples demonstrate in a non-limitative way methods for preparing the different types of membranes of the present invention.

Example 1

Preparation of Type 1 ILBM Membrane

Self-Standing Membrane:

120 mg of silicon-RTV (Dow Corning) were weighed and mixed with 120 mg of diluting agent (200 fluid—Dow Corning). To this were added 120 mg of ionic liquid, either $EmimCF_3SO_3$ or $BmimBF_4$, and 120 mg of hardening agent RTV-9162. All ingredients were mixed until a homogeneous mixture was achieved. 180 mg of the mixture were cast on a round teflon plate with a diameter of 2 cm, and air dried for 24 hours at room temperature to produce a self-standing membrane. The thickness of the dry membrane, as measured with a micrometer, was 280 µm, and 450 µm for $RTV-BmimBF_4$, and $RTV-EmimCF_3SO_3$, respectively.

Direct Casting of Membrane on Electrode:

100 mg of the mixture as prepared above for the self-standing membrane was directly cast as a thin layer on an aerogel carbon electrode (Marketech) having a diameter of 1.65 cm. Another aerogel electrode, having the same diameter, was then placed on the membrane layer before hardening. The MEA (Membrane Electrode Assembly) was allowed to air dry for 24 hours at room temperature. The calculated thickness of the membrane according to its geometrical surface area, weight and density, was 320 µm and 300 µm for $RTV-BmimBF_4$, and $RTV-EmimCF_3SO_3$, respectively.

Example 2

Preparation of Type 2 ILBM Membrane

A self-standing membrane or directly cast MEA of $RTV-BmimBF_4$ as prepared in Example 1 above, was submerged in a 3 ml basic solution of $NaCF_3SO_3$ (1.65 M of $CF_3SO_3H$+1 M of aqueous solution of NaOH in a volume ratio of 1:1.5; pH=13) and was sonicated for 3 hours, followed by further 16 hours without sonication. After ion exchange took place, the membrane or MEA was washed with de-ionized water and air dried for 24 hours at room temperature.

Example 3

Preparation of Type 3 ILBM Membrane 105 mg of solid BmimCl (Aldrich), 140 mg of 1 M aqueous solution of KOH (4 drops) for dissolving BmimCl, and 300 mg of a diluting agent (200 fluid Dow Corning) were mixed together. 300 mg of RTV 9161 were then weighed and added together with 8 drops of RTV 9162 hardener. The ingredients were mixed until achieving a homogeneous mixture. 265 mg of the final mixture were cast into a round teflon plate having a diameter of 2 cm to produce a self-standing membrane. The cast was air dried at room temperature for 24 hours. The thickness of this self-standing membrane, as measured with a micrometer, was 430 µm.

Direct casting type 3 membrane o electrode was achieved by applying 125 mg of the mixture on a aerogel carbon electrode with a diameter of 1.65 cm, followed by placing a second aerogel carbon electrode, with the same diameter, over the membrane layer before its hardening. The MEA was then air dried for 24 hours at room temperature.

Ion exchange in the membrane of $Cl^-$ to $CF_3SO_3^-$ was carried out by submerging the membrane or MEA in a 3 ml of 1 M aqueous solution of $CF_3SO_3Na$ (Aldrich) for 3 hours in a sonicator, followed by 16 hours without sonication. After ion exchange took place, the membrane or MEA were washed in de-ionized water and air dried for 24 hours at room temperature. The thickness of the self-standing membrane, as measured with a micrometer, was 430 µm. The calculated thickness of the MEA according to surface area, weight and density of the membrane was 320 µm.

While examples of the invention have been described for purposes of illustration, it will be apparent that many modifications, variations and adaptations can be carried out by persons skilled in the art, without exceeding the scope of the claims.

The invention claimed is:

1. A Ionic Liquid Based Membrane (ILBM) for fuel cells consisting of
   (A) polysiloxane-based Room Temperature Vulcanized matrix having a thickness equal to or greater than 140 µm, and
   (B) an ionic liquid selected from $BmimCF_3SO_3$ and $EmimCF_3SO_3$ evenly dispersed in said matrix, said ionic liquid being formed in situ in the membrane by an ion-exchange reaction in which anion $CF_3SO_3^-$ replaces a cheaper anion selected from $BF_4^-$ and $Cl^-$, said ionic liquid and said anions being the only charge carriers in said Membrane;
   wherein said matrix imparts to said Membrane mechanical features comprising flexibility, strength, and ruggedness, and, entrapped but freely moving in said matrix, imparts to said Membrane high conductivity, wherein said conductivity is not dependent on the membrane water content and is maintained even after heating above 65° C. and cooling down to 25° C., said Membrane being impermeable to methanol and being chemically stable up to a temperature of 400° C. according to TGA.

2. The ILBM according to claim 1, wherein said Membrane operates under acidic conditions.

3. The ILBM according to claim 1, wherein said Membrane operates under basic conditions.

4. The ILBM according to claim 1, wherein said Membrane is directly cast on an electrode, or said Membrane is self-standing.

5. The ILBM according to claim 1, wherein said Membrane is prepared by mixing the polysiloxane-based Room Temperature Vulcanized matrix and the ionic liquid.

6. The ILBM according to claim 1, wherein said Membrane is prepared by providing a solid salt which is a non-ionic liquid after dissolving in the polysiloxane-based Room Temperature Vulcanized matrix and then producing the ionic liquid in the polysiloxane-based Room Temperature Vulcanized matrix by ion exchange.

7. The ILBM according to claim 6, wherein said solid salt is BmimCl or EmimCl.

* * * * *